(12) United States Patent
Arisaka et al.

(10) Patent No.: US 6,442,796 B2
(45) Date of Patent: Sep. 3, 2002

(54) AIR DAMPER

(75) Inventors: Oomi Arisaka, Yokohama; Seiji Takasugi; Masato Suzuki, both of Toyota, all of (JP)

(73) Assignee: Piolax, Inc., Kanagawa-Ken (JP)

( * ) Notice: Subject to any disclaimer, the term of this patent is extended or adjusted under 35 U.S.C. 154(b) by 0 days.

(21) Appl. No.: 09/755,533

(22) Filed: Jan. 5, 2001

(30) Foreign Application Priority Data

Jan. 7, 2000 (JP) ........................................ 2000-001197

(51) Int. Cl.[7] .............................. E05F 3/00; E05F 5/10
(52) U.S. Cl. ................ 16/84; 16/61; 16/63; 16/66; 188/288; 188/322.15
(58) Field of Search ................................ 16/84, 49, 61, 16/66, 63, 78; 188/288, 281, 282.1, 282.2, 322.15, 322.22

(56) References Cited

U.S. PATENT DOCUMENTS

| 228,856 | A | * | 6/1880 | Bauman | 16/78 |
| 842,121 | A | * | 1/1907 | Smith | 16/63 |
| 4,433,759 | A | | 2/1984 | Ichinose | 188/282 |
| 4,854,541 | A | | 8/1989 | McConnell | 248/565 |
| 4,883,387 | A | | 11/1989 | Myers et al. | 405/195 |
| 4,991,256 | A | * | 2/1991 | Jeynes et al. | 16/61 |
| 5,722,114 | A | * | 3/1998 | Lapp et al. | 16/286 |
| 5,727,286 | A | | 3/1998 | Shen | 16/49 |
| 5,845,749 | A | * | 12/1998 | Moretz et al. | 16/67 |
| 6,189,662 | B1 | * | 2/2001 | Bivens et al. | 188/288 |
| 6,199,673 | B1 | * | 3/2001 | Wach | 188/322.15 |

FOREIGN PATENT DOCUMENTS

| EP | 0562284 A1 | 9/1993 | ........... B60R/00/06 |
| JP | 2557064 | 8/1997 | ............. B60R/7/06 |

* cited by examiner

Primary Examiner—Chuck Y. Mah
(74) Attorney, Agent, or Firm—Howard & Howard

(57) ABSTRACT

An air damper consists of a tubular cylinder with opposite ends, a piston movable in the cylinder, a first coil spring for resiliently biasing the piston in the direction of one end of the cylinder, a string for transferring dampening effect produced by a motion of the piston to an openable object, a shaft with a flange slidably fitted into the piston and a second coil spring interposed between the flange of the shaft and the piston inside the first coil spring. The second coil spring exerts a resilient biasing force at later stages of the motion of the piston in the direction of the other end of the tubular cylinder.

7 Claims, 8 Drawing Sheets

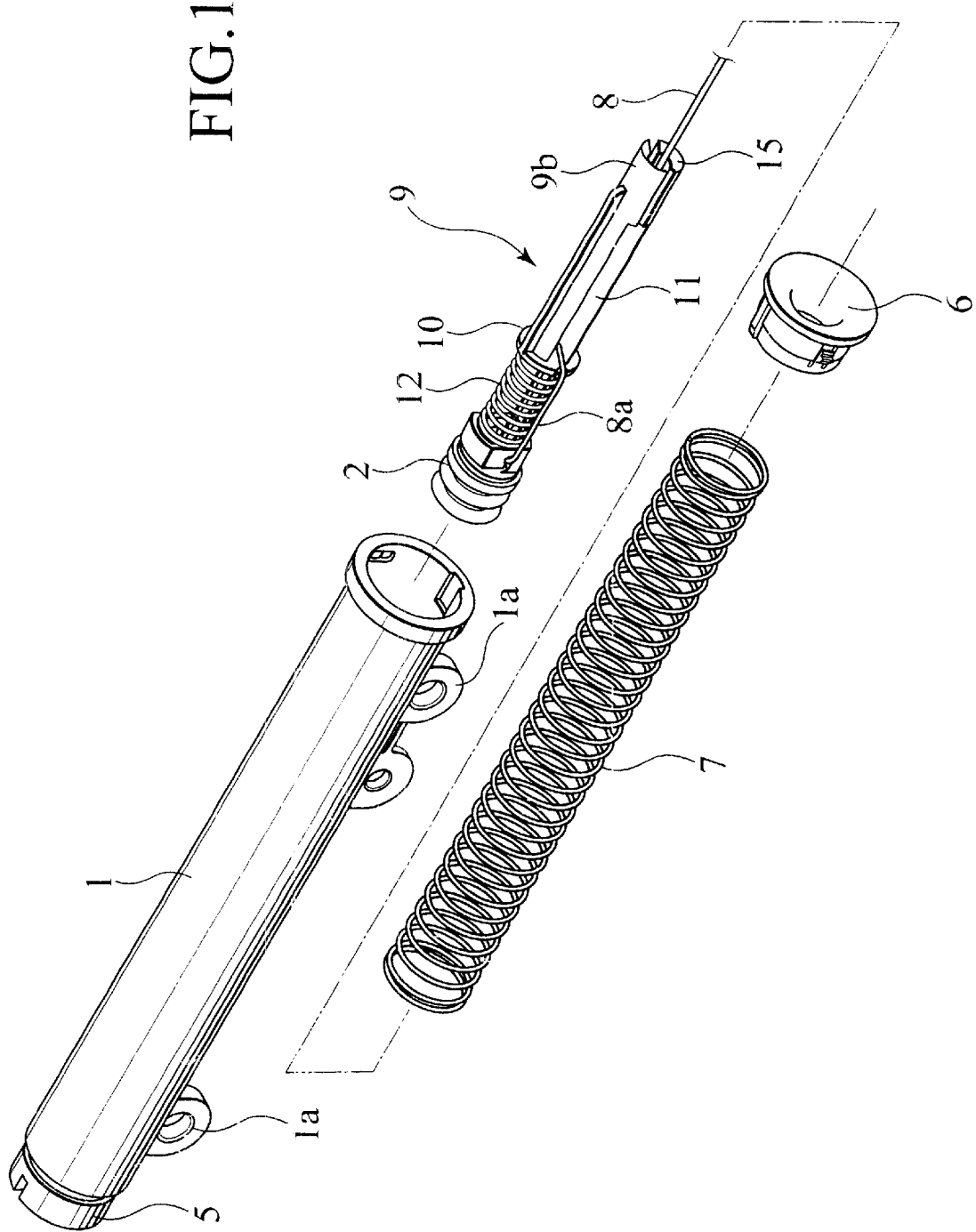

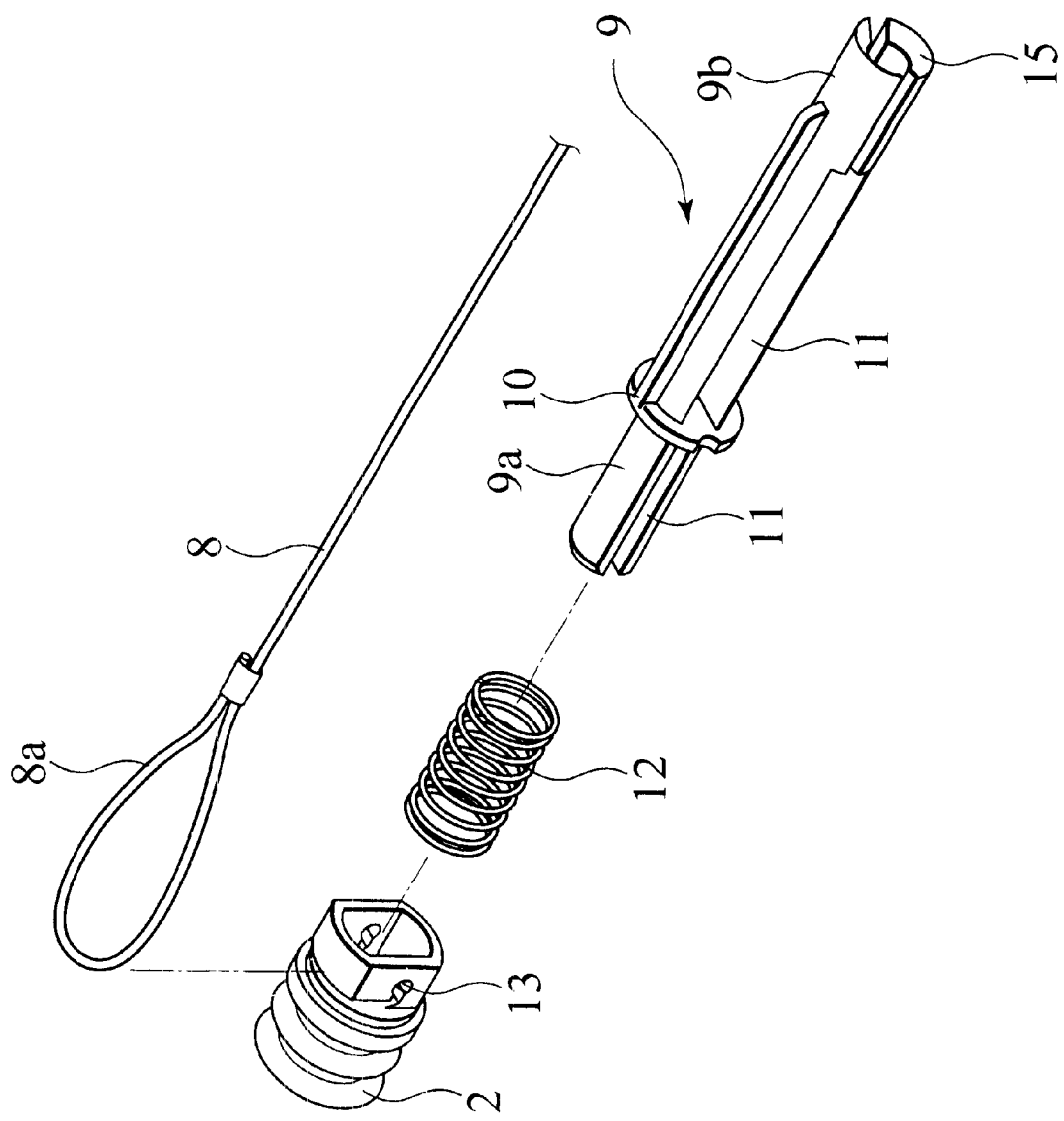

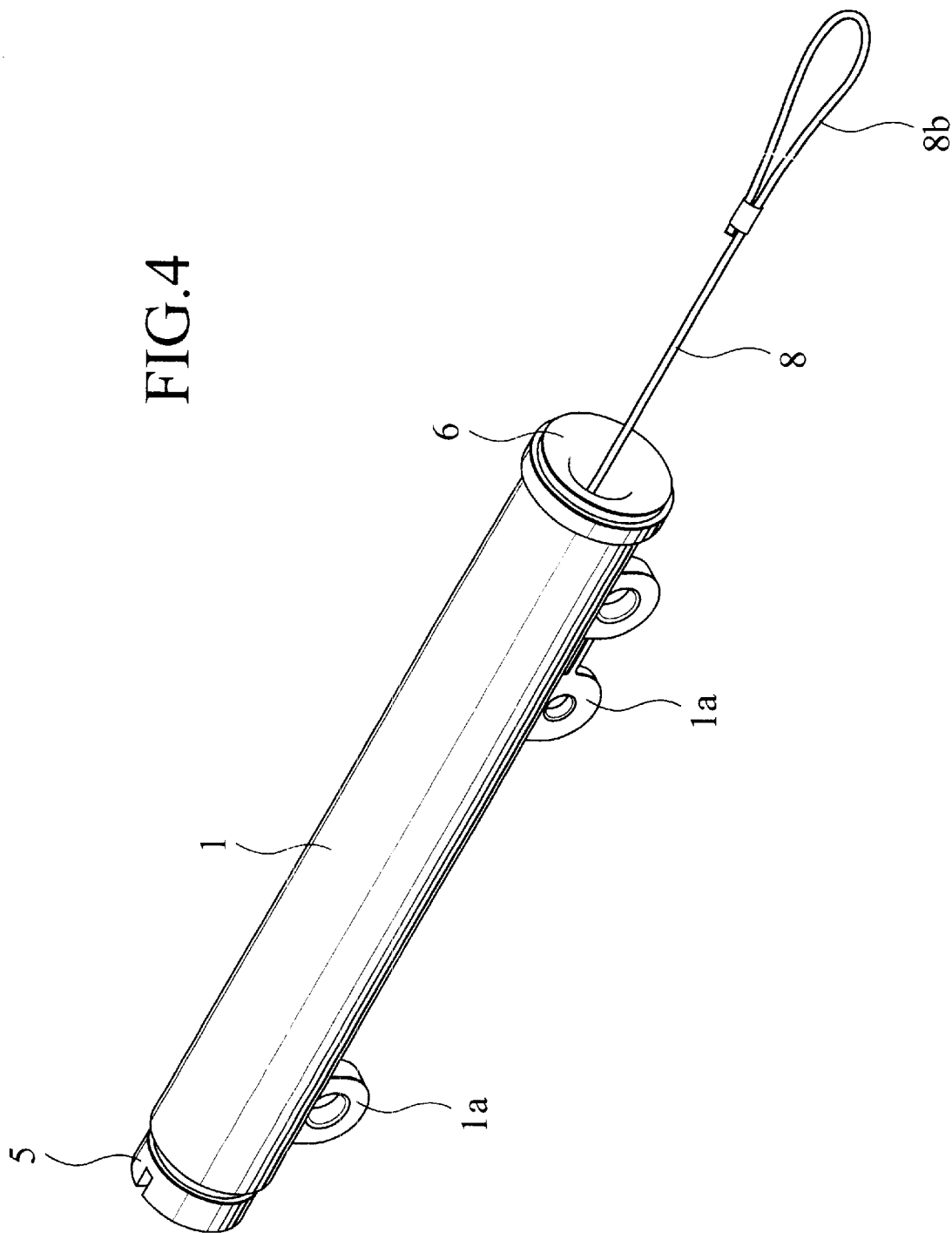

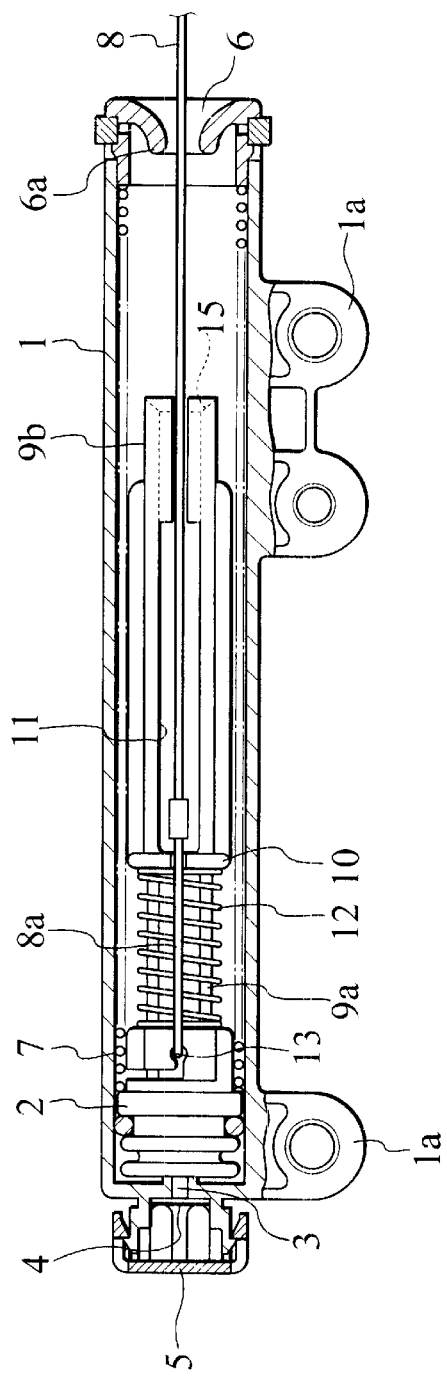
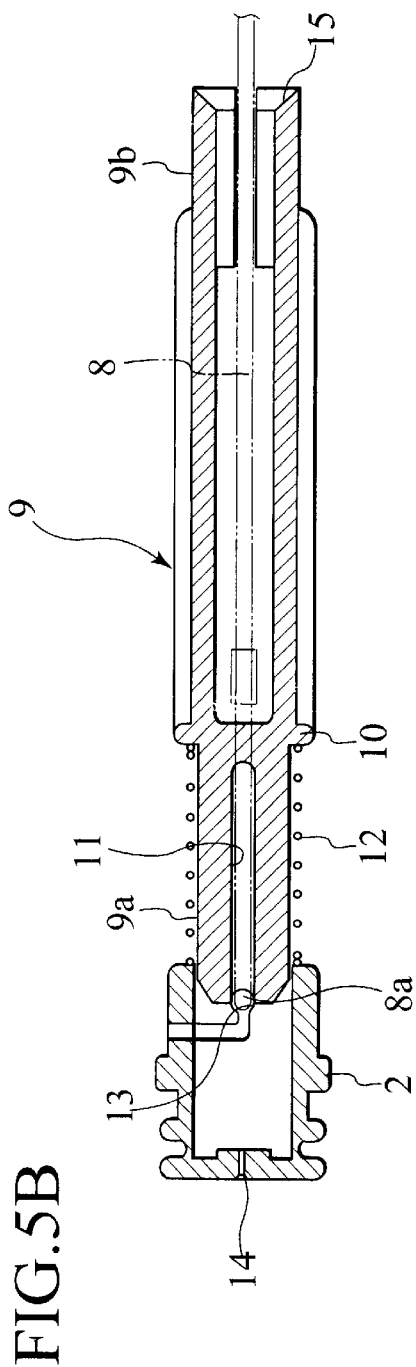
FIG.5A
FIG.5B

AIR DAMPER

BACKGROUND OF THE INVENTION

1. Field of the Invention

The present invention relates to an improved cylinder-type air damper for use in, for example, glove boxes of automobiles.

2. Description of the Related Art

A conventional air damper of this type is disclosed in Japanese Utility Model Registration Publication No. 2557064.

The conventional air damper, not shown in a figure, comprises a tubular cylinder with both ends open, a piston movable in the cylinder, to which piston a base loop of a string is coupled, a valve device attached to one opening end of the cylinder to control the amount of air passage, a guide cap attached to the other opening end of the cylinder and having a guide wall for the string and a compression coil spring interposed between the guide cap and the piston in the cylinder to resiliently bias the piston in the direction of the one end of the cylinder.

When the air damper is used in a glove box of an automobile, the cylinder is fixed to an instrument panel side, and the top end of the string extending outward from the guide cap of the cylinder is fixed to a glove box side. When the glove box is moved in the opening direction, the string is gradually drawn out from the cylinder, and the piston moves in the same direction while compressing the compression coil spring against its resilient biasing force in the cylinder. At that time, air flows into the cylinder via the valve device, producing a dampening effect. This ensures that the glove box gradually moves to an opening state.

When the glove box is moved in the closing direction, the piston is forcefully pushed back with the string in the direction of the one end of the cylinder by the resilient biasing force of the compression coil spring, and the air accumulated in the cylinder is released via the valve device to the outside. As a result, the piston swiftly moves in the cylinder, promoting the closing motion of the glove box.

As described above, the conventional air damper has an advantage of ensuring smooth opening/closing motions of the glove box. However it has a fear of generation of impulsive sound at the time of full opening of the glove box due to a shortage of dampening effect when the glove box is upsized and weighs more, or moves close to the full opening position according to a geometrical location where the center of gravity of the glove box door moves beyond the top dead center of a pivot shaft in a direction to move away from the pivot shaft so that the moving speed of the glove box door rapidly increases due to acceleration or an increase of angular moment.

SUMMARY OF THE INVENTION

The present invention has been achieved with such points in mind.

It therefore is an object of the present invention to provide an air damper which can effectively solve the above-described problem of the conventional air damper.

To achieve the object, according to a first aspect of the present invention, there is provided an air damper comprising a tubular cylinder with a first opening end and a second opening end, a piston movable in the cylinder, a first coil spring resiliently biasing the piston in the cylinder in the direction of the first end of the cylinder, and a string for transferring a dampening effect produced by a motion of the piston to an openable object, a shaft with a flange slidably fitted into the piston and a second coil spring interposed between the flange of the shaft and the piston inside the first coil spring, the second coil spring exerting a resilient biasing force at later stages of the motion of the piston in the direction of the first opening end of the tubular cylinder.

Thus in the present invention, even when an openable object is upsized or moves close to the full opening position with a geometrical location where the center of gravity of an absorbed object (glove box door) moves beyond the top dead center of a pivot shaft in a direction to move away from the pivot shaft, the second coil spring exerts the resilient biasing force as well as the first coil spring does at later stages of the moving range of the piston. As a result, the fear of generation of impulsive sound at the time of full opening of the openable object due to a shortage of dampening effect can be surely prevented.

As a second aspect, a hook is preferably provided in the piston of the air damper according to the present invention for hooking a base loop of the string thereon, and a slit is preferably provided in both sides of the shaft between which the flange is sandwiched so as to pass the base loop of the string therethrough.

Thus in the present invention, when sliding into the piston, the shaft can be prevented from interfering with the base loop of the string, maintaining the slidable relationship with the piston.

As a third aspect, a tapered surface is preferably provided internally at an edge of the shaft of the air damper according to the present invention, and an abutment is preferably provided on a cap that is attached to the second opening end of the cylinder, the abutment abutting against the tapered surface.

Thus in the present invention, when the edge of the shaft abuts against the cap with a piston motion, the tapered surface formed internally at the edge abuts against the abutment of the cap, thereby elastically widening the edge of the shaft through slits. This structure absorbs shock and prevents the generation of striking sound.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 1 is an exploded perspective view of an air damper according to an embodiment of the present invention;

FIG. 2 is an exploded perspective view of the air damper showing the relationship of a piston, a second compression coil spring, a shaft and a string with each other;

FIG. 4 is a perspective view showing the assembled damper in its entirety;

FIG. 5A is a sectional view showing the assembled damper in its entirety;

FIG. 5B is a sectional view showing the relationship between the piston and the shaft in FIG. 5A;

DETAILED DESCRIPTION OF THE PREFERRED EMBODIMENT

Figure 3A:
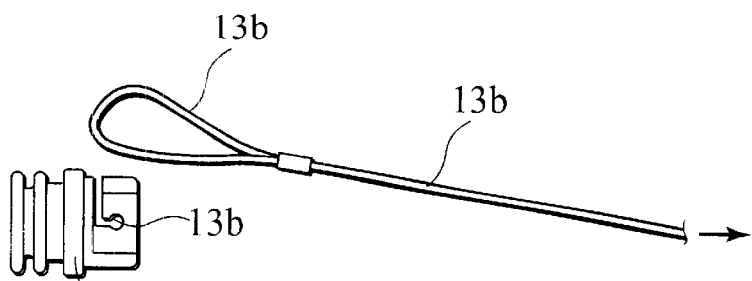
FIGS. 3A, 3B, 3C and 3D are explanatory views of the air damper showing the attachment of the piston to the shaft via the string.
Figure 3B:
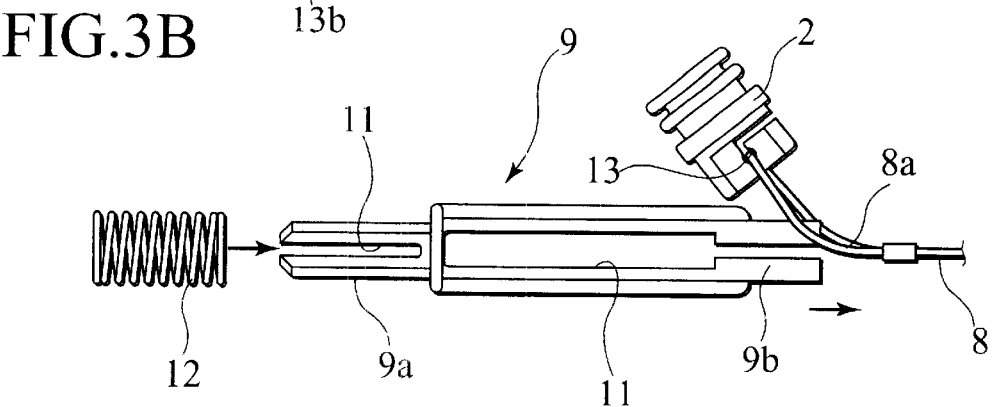
Figure 3C:
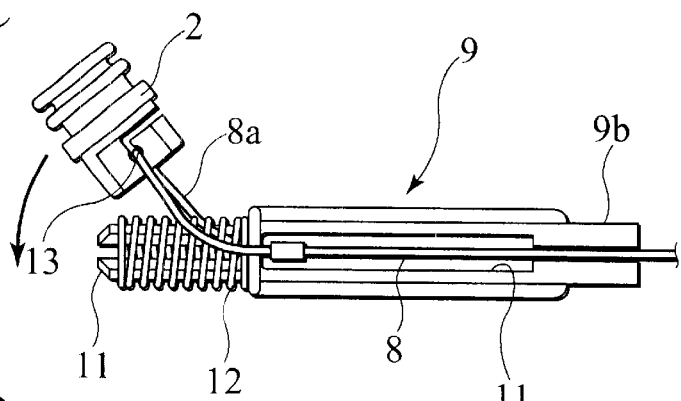
Figure 3D:
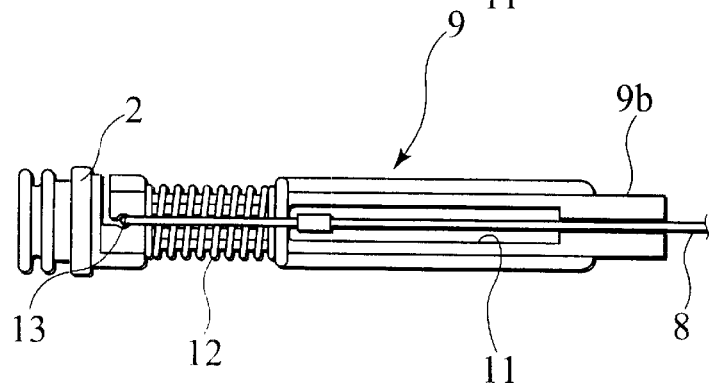

With reference to the accompanying drawings, a preferred embodiment of the present invention will be described below.

As shown in FIGS. 1 and 5, an air damper according to the embodiment comprises a tubular cylinder 1 with opposite ends open, a piston 2 movable in the cylinder 1, an end cap 5 with a valve 4 opened/closed for a through hole 3 provided at a first end of the cylinder 1, a guide cap 6 guiding at a second end of the cylinder 1 a motion of a string 8 that is described later, a first compression coil spring 7 of a larger diameter that is interposed between the guide cap 6 and the piston 2 in the cylinder 1 to resiliently bias the piston 2 in the direction of the first end of the cylinder 1, and the string 8 transferring a dampening effect with a motion of the piston 2 to an openable object such as a glove box.

As shown in FIG. 2, the air damper of the present embodiment further comprises a shaft 9 with an annular flange 10 that is slidably fitted into the piston 2 in the cylinder 1, and a second compression coil spring 12 of a smaller diameter interposed between the annular flange 10 of the shaft 9 and the piston 2 inside the first compression coil spring 7.

More specifically, the piston 2 has a hollow body with an opening opposed to the shaft 9, a hook groove 13 as a J-shaped hook for hooking a base loop 8a of the string 8 in the vicinity of the opening, and an orifice 14 for providing an air passage through its bottom wall. The shaft 9 has tubular bodies 9a and 9b which sandwiches the annular flange 10 therebetween. Each of the tubular bodies 9a and 9b has a pair of slits 11 opposing to each other in the longitudinal direction. The second compression coil spring 12 is fitted onto the shorter tubular body 9a. A tapered surface 15 is formed internally at the edge of the longer tubular body 9b.

Now with reference to FIGS. 3A to 3D, the assembly of the piston 2, the second compression coil spring 12, and the shaft 9 will be described.

First, the base loop 8a of the string 8 is hooked on the hook groove 13 of the piston 2 and drawn through the slits 11 formed in the longer tubular body 9b of the shaft 9. On the other hand, the second compression coil spring 12 is fitted onto the shorter tubular body 9a of the shaft 9. Then the top end of the shorter tubular body 9b of the shaft 9 is fitted into the hollow body of the piston 2 from its opening with clearance therebetween. The second compression coil spring 12 is thus interposed between the annular flange 10 of the shaft 9 and the opening end of the piston 2. In this state, the base loop 8a of the string 8 is engagingly caught on the root of the slits 11 of the longer tubular body 9b of the shaft 9. Thus there is no fear that the resilient biasing force of the second compression coil spring 12 might separate the piston 2 from the shaft 9. A part of the base loop 8a of the string 8 hooked on the hook groove 13 of the piston 2 travels through the slits 11 of the shorter tubular body 9a of the shaft 9. Thus there is no obstacle for the shaft 9 to slide into the piston 2.

The above assembled parts with the first compression coil spring 7 fitted on the periphery of the shaft 9 are pushed into the cylinder 1 from the second opening end thereof. Finally the guide cap 6 is attached to the second opening end. FIGS. 4, 5A and 5B show the one-way mode air damper assembled easily as described above. In this state, as shown in FIG. 5B, the top end of the shorter tubular body 9a of the shaft 9 is slidably fitted into the opening of the piston 2, and a part of the base loop 8a of the string 8 faces the slits 11 of the shorter tubular body 9a.

When used in a glove box of an automobile, in a manner similar to a conventional one not shown in the figures, the cylinder 1 is fixed to an instrument panel side via a mounting piece 1a, and a top loop 8b of the string 8 extending from the guide cap 6 of the cylinder 1 is drawn out to be fixed to a glove box side, whereby ensuring opening/closing motions of the glove box.

Figure 6:
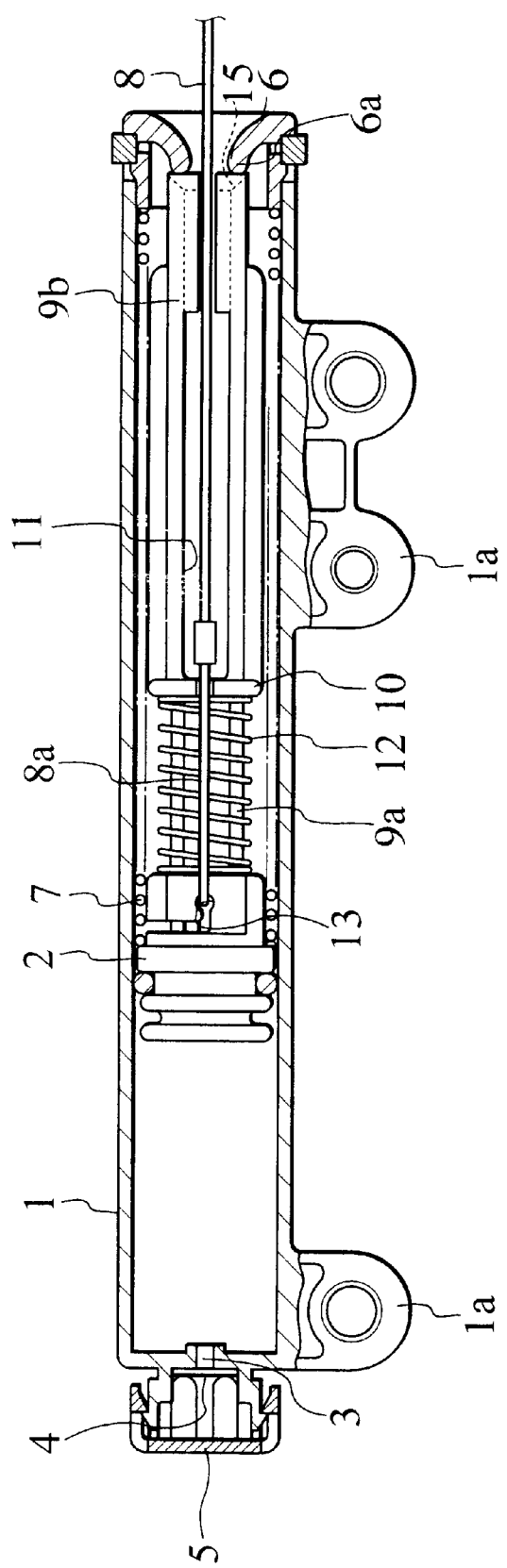
FIG. 6 is a sectional view showing the state where a longer tubular body of the shaft abuts against a guide wall of a guide cap.

In this state, when the glove box is moved in the opening direction, the string 8 is accordingly drawn out gradually through the guidance of a guide wall 6a formed on the guide cap 6, and the piston 2 moves in the same direction while compressing the first compression coil spring 7 against the resilient biasing force thereof. This results in a dampening effect through the flow resistance of air passing through the orifice 14 provided at the piston 2 side, ensuring a gradual motion of the glove box into an opening state. As shown in FIG. 6, with a motion of the piston 2, the shaft 9 also moves in the same direction while maintaining the above-described relationship with the piston 2, and the edge of the longer tubular body 9b of the shaft 9 abuts against the guide wall 6a of the guide cap 6.

Figure 7A:
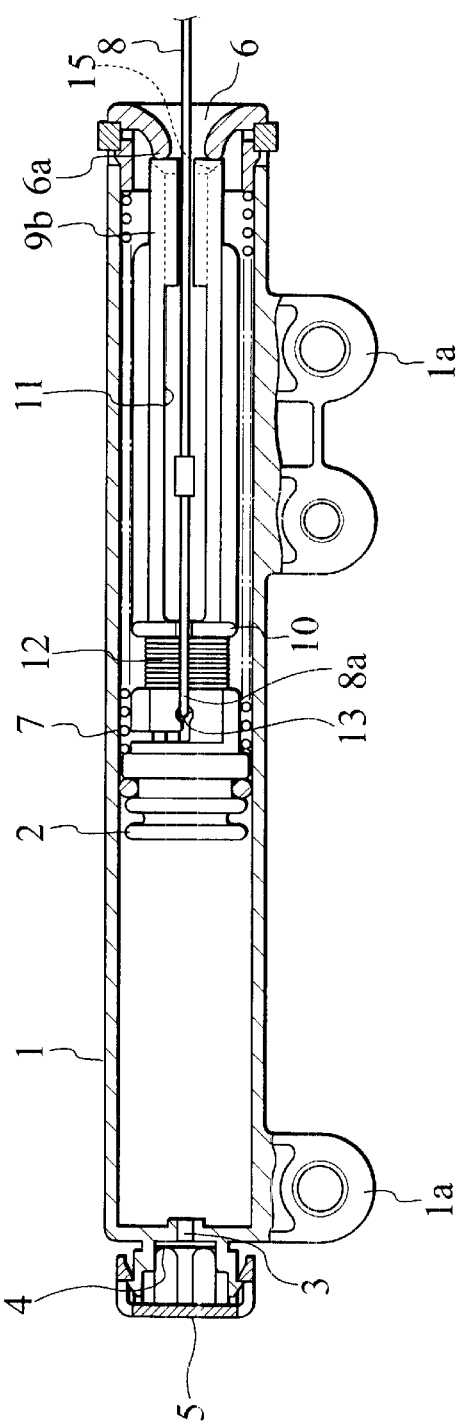
FIG. 7A is a sectional view showing the state where the second compression coil spring is compressed.
Figure 7B:
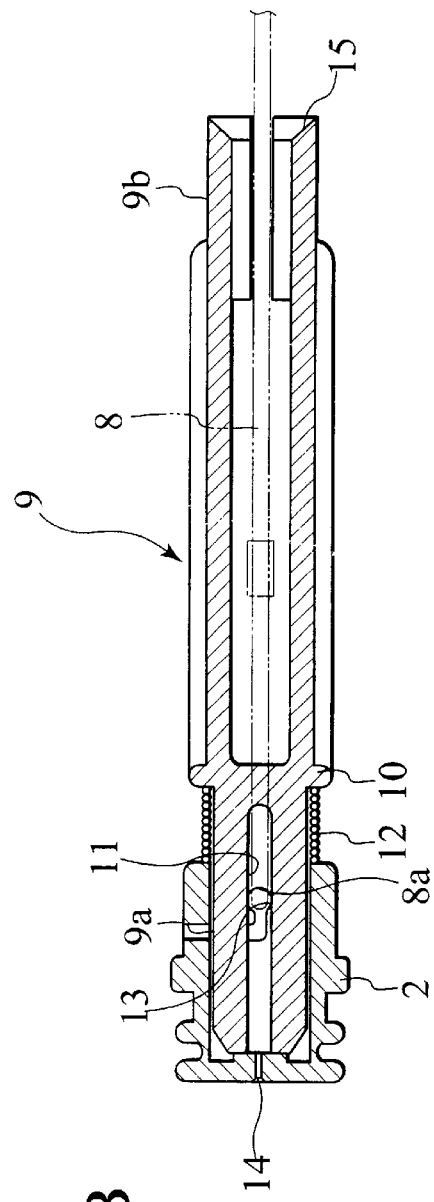
FIG. 7B is a sectional view showing the relationship between the piston and the shaft in FIG. 7A.
Figure 8:
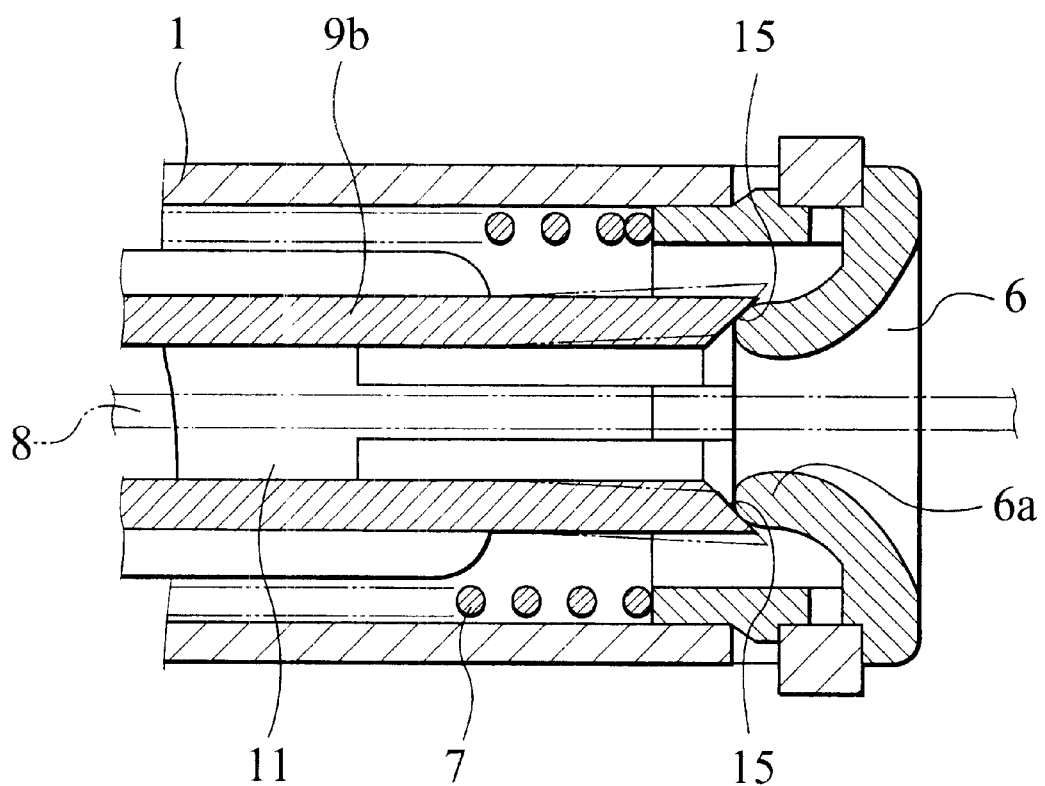
FIG. 8 is an enlarged explanatory view showing the state where an edge of the longer tubular body of the shaft abuts against an edge of the guide wall of the guide cap.

Then, as shown in FIGS. 7A and 7B, in addition to the compression of the first compression coil spring 7 by the piston 2, the second compression coil spring 12 is also compressed by the piston 2 against the resilient biasing force thereof on the shorter tubular body 9a of the shaft 9. The sum total of the resilient biasing forces of both the springs 7 and 12 eliminates a fear of generation of impulsive sound at the time of full opening of the glove box, even when the glove box(door) is upsized or moves in the opening direction with an geometrical location where the center of gravity of the glove box (door) moves beyond the top dead center of the pivot shaft(axis) in a direction to move away from the pivot shaft(axis) and even when the moving speed of the glove box (door)suddenly increases due to acceleration or an increase of angular moment as the glove box moves closer to the full opening position. When the second compression coil spring 12 is compressed by the piston 2, the top end of the shorter tubular body 9a of the shaft 9 slides into the hollow body of the piston 2 as shown in FIG. 7B. The part of the base loop 8a of the string 8 hooked on the hook groove 13 travels through the slits 11 of the shorter tubular body 9a. Thus there is no interference between the shaft 9 and the base loop 8a.

When the edge of the longer tubular body 9b of the shaft 9 abuts against the guide wall 6a as an abutment of the guide cap 6, the tapered surface 15 formed internally at its edge elastically abuts against the edge of the guide wall 6a of the guide cap 6. The edge side of the longer tubular body 9b is elastically widened via the slits 11. This structure absorbs shock and prevents the generation of striking sound.

Conversely, when the glove box is moved to the closing direction, the piston 2 is forcefully pushed back with the string 8 in the direction of the first end of the cylinder 1 by the resilient biasing force of the first compression coil spring 7. The air accumulated in the cylinder 1 is released outside from the end cap 5 through the through hole 3 by the opened valve 4. Thus the piston 2 swiftly moves in the cylinder 1 to promote the closing motion of the glove box. In earlier stages of the pushing back of the piston 2, the second compression coil spring 12 also expands, thus the resilient biasing forces of both the springs 7 and 12 being involved.

In this embodiment, the first compression coil spring 7 that works in the full moving range of the piston 2 has a larger compression amount and a larger compression rate than the second compression coil spring 12. As a result, the first compression coil spring 7 is likely to buckle when being pushed into the cylinder 1. However, the first compression coil spring 7 has a larger diameter to prevent the buckling relatively well. Further the second compression coil spring 12 of a smaller diameter is interposed between the annular flange 10 of the shaft 9 and the piston 2 while being fitted onto the shorter tubular body 9a of the shaft 9, thereby being stably supported.

The entire contents of Japanese Patent Application 2000-001197 (filed on Jan. 7, 2000) are incorporated herein by reference.

Although the invention has been described above by reference to certain embodiments of the invention, the invention is not limited to the embodiments described above. Modifications and variations of the embodiments descried above will occur to those skilled in the art, in light of the above teachings. The scope of the invention is defined with reference to the following claims.

What is claimed is:

1. An air damper, comprising:
    a tubular cylinder with a first end and a second end;
    a piston having a hollow end movable in the cylinder in a longitudinal direction;
    a first coil spring for resiliently biasing the piston in the cylinder in the direction of the first end of the cylinder;
    a string having a first end affixed to the piston and a second end extending from the cylinder to be connected to an openable object so as to transfer a dampening effect produced by a motion of the piston to the openable object;
    a shaft having a flange, the shaft being slidably received into the hollow end of the piston in the cylinder; and
    a second coil spring interposed between the flange of the shaft and the piston and being inside the first coil spring, the second coil spring exerting a resilient biasing force on the piston in the direction of the first end of the tubular cylinder when the first coil spring is compressed.

2. An air damper as set forth in claim 1 wherein, the piston has a hook for hooking a base loop of the string.

3. An air damper as set forth in claim 1 wherein, the shaft comprises a first tubular body and a second tubular body between which the flange is sandwiched.

4. An air damper as set forth in claim 3 wherein, each of the first tubular body and the second tubular body of the shaft has a slit for passing the base loop of the string therethrough.

5. An air damper as set forth in claim 4 further comprising:
    a cap attached to the second opening end of the cylinder, the cap having an abutment,
    wherein the shaft has a tapered surface formed internally at an edge of the shaft wherein the tapered surface abuts against the abutment of the cap when the shaft is longitudinally translated to the second end of the cylinder.

6. An air damper as set forth in claim 1 further comprising:
    a cap attached to the second opening end of the cylinder, the cap having an abutment.

7. An air damper as set forth in claim 6 wherein, the shaft has a tapered surface formed internally at an edge of the shaft wherein the tapered surface abuts against the abutment of the cap when the shaft is longitudinally translated to the second end of the cylinder.

* * * * *